US008244902B2

(12) United States Patent
Oved

(10) Patent No.: US 8,244,902 B2
(45) Date of Patent: *Aug. 14, 2012

(54) DEVICE, SYSTEM, AND METHOD OF DISTRIBUTING MESSAGES

(75) Inventor: Tzah Oved, Ramat Gan (IL)

(73) Assignee: Voltaire Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/334,216

(22) Filed: Dec. 22, 2011

(65) Prior Publication Data

US 2012/0096105 A1    Apr. 19, 2012

Related U.S. Application Data

(63) Continuation of application No. 12/195,805, filed on Aug. 21, 2008, now Pat. No. 8,108,538.

(51) Int. Cl.
G06F 15/16 (2006.01)

(52) U.S. Cl. ........ 709/231; 709/200; 709/212; 711/112; 711/113

(58) Field of Classification Search .................. 709/212, 709/231, 232; 711/112, 113
See application file for complete search history.

(56) References Cited

U.S. PATENT DOCUMENTS

| | | | | |
|---|---|---|---|---|
| 5,974,054 A * | 10/1999 | Couts et al. | ................. | 370/470 |
| 6,545,981 B1 * | 4/2003 | Garcia et al. | ................. | 370/242 |
| 6,629,318 B1 * | 9/2003 | Radha et al. | ................. | 725/134 |
| 7,111,147 B1 * | 9/2006 | Strange et al. | ................. | 711/209 |
| 7,117,521 B2 * | 10/2006 | Puthiyedath | ................. | 725/107 |
| 7,376,755 B2 * | 5/2008 | Pandya | ................. | 709/250 |
| 7,430,615 B2 * | 9/2008 | Blackmore et al. | ................. | 709/245 |
| 7,478,138 B2 * | 1/2009 | Chang et al. | ................. | 709/212 |
| 7,536,462 B2 * | 5/2009 | Pandya | ................. | 709/227 |
| 7,886,180 B2 * | 2/2011 | Jin et al. | ................. | 714/2 |
| 2002/0152315 A1 * | 10/2002 | Kagan et al. | ................. | 709/228 |
| 2003/0053462 A1 * | 3/2003 | Garcia et al. | ................. | 370/394 |
| 2004/0013121 A1 * | 1/2004 | Higashigawa et al. | ................. | 370/400 |
| 2004/0158754 A1 * | 8/2004 | Walls et al. | ................. | 713/323 |
| 2006/0045099 A1 * | 3/2006 | Chang et al. | ................. | 370/400 |
| 2006/0045109 A1 * | 3/2006 | Blackmore et al. | ................. | 370/402 |
| 2006/0059242 A1 * | 3/2006 | Blackmore et al. | ................. | 709/211 |
| 2006/0209862 A1 * | 9/2006 | Shoham et al. | ................. | 370/412 |
| 2006/0212644 A1 * | 9/2006 | Acton et al. | ................. | 711/103 |
| 2006/0274748 A1 * | 12/2006 | Nakashima et al. | ................. | 370/389 |
| 2006/0288391 A1 * | 12/2006 | Puthiyedath | ................. | 725/89 |
| 2007/0208820 A1 * | 9/2007 | Makhervaks et al. | ................. | 709/212 |
| 2010/0049821 A1 * | 2/2010 | Oved | ................. | 709/212 |

* cited by examiner

Primary Examiner — John Follansbee
Assistant Examiner — Anthony Mejia
(74) Attorney, Agent, or Firm — Eitan Mehulal & Sadot

(57) ABSTRACT

Device, system, and method of distributing messages. For example, a data publisher capable of communication with a plurality of subscribers via a network fabric, the data publisher comprising: a memory allocator to allocate a memory area of a local memory unit of the data publisher to be accessible for Remote Direct Memory Access (RDMA) read operations by one or more of the subscribers; and a publisher application to create a message log in said memory area, to send a message to one or more of the subscribers using a multicast transport protocol, and to store in said memory area a copy of said message. A subscriber device handles recovery of lost messages by directly reading the lost messages from the message log of the data publisher using RDMA read operation(s).

16 Claims, 3 Drawing Sheets

US 8,244,902 B2

DEVICE, SYSTEM, AND METHOD OF DISTRIBUTING MESSAGES

PRIOR APPLICATION DATA

This application is a continuation of, and claims priority and benefit from, U.S. patent application Ser. No. 12/195,805, titled "Device, System, and Method of Distributing Messages", filed on Aug. 21, 2008, which is hereby incorporated by reference in its entirety.

FIELD

Some embodiments are related to the field of communication, and more particularly to publication of data to multiple subscribers.

BACKGROUND

In some communication system, a data publisher (e.g., a server) may distribute data to thousands of subscribers (e.g., clients). Data delivery may be performed, for example, using multicast data transport.

Unfortunately, multicast data transport may have disadvantages. For example, it may require significant overhead at the publisher side; it may deliver to a particular subscriber data that the particular subscriber does not need; and it may require, for reliable data delivery purposes, re-transmit mechanisms to improve reliability of data delivery. Utilization of additional layer of reliable protocol may increase even more the fabric utilization and/or the subscriber overhead, which in turn may result in a "multicast storm" and further loss of subsequent data; it may suffer from additional latency, e.g., a bi-product of the additional reliable protocol; it may result in a dependency of the subscribers on the publisher for active delivery (e.g., "push") of data by the publisher to the subscribers; it may result in a dependency of the publisher on the subscribers for active acknowledgment (e.g., "push") of data delivery by the subscribers to the publisher; and it may require a synchronization scheme, a timing scheme, or other coupling scheme between the publisher and the subscribers.

SUMMARY

Some embodiments include, for example, devices, systems, and methods of distributing messages, e.g., from a data publisher to multiple data subscribers.

Some embodiments include, for example, a data publisher capable of communication with a plurality of subscribers via a network fabric, the data publisher including: a memory allocator to allocate a memory area of a local memory unit of the data publisher to be accessible for Remote Direct Memory Access (RDMA) read operations by one or more of the subscribers; and a publisher application to create a message log in said memory area, to send a message to one or more of the subscribers using a multicast transport protocol, and to store in said memory area a copy of said message.

In some embodiments, one or more of the subscribers are authorized by the data publisher to read one or more messages stored in said memory area using one or more RDMA read operations independently of access to said memory area by other subscribers.

In some embodiments, the memory area includes a cyclic buffer able to store copies of messages sent using the multicast transport protocol by the publisher application to one or more of the subscribers.

In some embodiments, the data publisher includes a message builder to insert a header into said message, wherein the header includes: a value indicating a sequence number of said message; a value indicating a size of said message; and a value indicating a virtual memory address of a memory location of said memory area in which the copy of said message is stored.

In some embodiments, the data publisher includes a message builder to insert a header into said message, wherein the header includes: a value indicating a sequence number of said message; and a value indicating a virtual memory address of said memory area in which a copy of a message consecutive to said message is stored.

In some embodiments, the publisher application is to send said message using the multicast transport protocol through InfiniBand hardware.

In some embodiments, the publisher application is to send said message by one or more operations that bypass an Operating System (OS) of the data publisher.

In some embodiments, the memory area is registered to be accessible through RDMA read operations by a RDMA-capable hardware component of one or more of the subscribers.

Some embodiments includes a subscriber device capable of receiving messages from a publisher device via a network fabric, the subscriber device including: a subscriber application to receive a first message from said publisher device using a multicast transport protocol, to receive a second message from said publisher device using the multicast transport protocol, and, if a message sequence number of the second message is non-consecutive to a message sequence number of the first message, to retrieve from a message log of said publisher device using one or more Remote Direct Memory Access (RDMA) read operations one or more multicast messages sent by the publisher device using the multicast transport protocol after the first message and before the second message.

In some embodiments, the subscriber application is to calculate a virtual memory address in said message log, from which the subscriber application is to read said one or more messages, based on information included in a header of the first message.

In some embodiments, the information included in the header of the first message includes: a value indicating a sequence number of the first message; a value indicating a size of the first message; and a value indicating a virtual memory address of said message log in which a copy of the first message is stored.

In some embodiments, the information included in the header of the first message includes: a value indicating a sequence number of the first message; and a value indicating a virtual memory address of the message log in which a copy of a message consecutive to the first message is stored.

In some embodiments, the subscriber application is to receive the first and second messages using the multicast transport protocol through InfiniBand hardware.

In some embodiments, the subscriber application is to receive the first and second messages by one or more operations that bypass an Operating System (OS) of the data publisher.

In some embodiments, the message log is registered to be accessible through RDMA read operations by a RDMA-capable hardware component of the subscriber device.

In some embodiments, the subscriber application is to retrieve one or more lost multicast messages by direct access of the subscriber device to the message log of the publisher device through one or more RDMA read operations by a RDMA-capable hardware component of the subscriber device.

In some embodiments, the subscriber application is to detect that one or more multicast messages were lost, based on a control message received from the data publisher indicating one or more characteristics of a last sent message.

Some embodiments include a method of distributing messages from a data publisher to a plurality of subscribers via a network fabric, the method including: allocating a memory area of a local memory unit of the data publisher to be accessible for Remote Direct Memory Access (RDMA) read operations by one or more of the subscribers; creating a message log in said memory area; sending a message to one or more of the subscribers using a multicast transport protocol; and storing in said memory area a copy of said message.

In some embodiments, the method includes: inserting a header into said message, wherein the header includes: a value indicating a sequence number of said message; a value indicating a size of said message; and a value indicating a virtual memory address of a memory location of said memory area in which the copy of said message is stored.

In some embodiments, the method includes: inserting a header into said message, wherein the header includes: a value indicating a sequence number of said message; and a value indicating a virtual memory address of said memory area in which a copy of a message consecutive to said message is stored.

Some embodiments include a method of receiving messages by a subscriber device from a publisher device via a network fabric, the method including: receiving a first message from the publisher device using a multicast transport protocol; receiving a second message from the publisher device using the multicast transport protocol; and if a message sequence number of the second message is non-consecutive to a message sequence number of the first message, retrieving from a message log of the publisher device using one or more Remote Direct Memory Access (RDMA) read operations one or more multicast messages sent by the publisher device using the multicast transport protocol after the first message and before the second message.

In some embodiments, the method includes: based on information included in a header of the first message, calculating a virtual memory address in said message log to which said one or more RDMA read operations are applied.

In some embodiments, the method includes: receiving from the publisher device a control message indicating a sequence identifier of a last published message; and if the sequence identifier of the last published message is greater than a sequence number of a last received message, retrieving one or more lost messages from the message log of the publisher device using one or more RDMA read operations.

In some embodiments, the method includes: indicating successful receipt of one or more messages by the subscriber device to the publisher device by sending from the subscriber device to the publisher device an indication of a sequence number of a last received message.

In some embodiments, the method includes: indicating successful receipt of one or more messages by the subscriber device to the publisher device by performing a RDMA write operation from the subscriber device to the publisher device.

In some embodiments, the method includes: indicating successful receipt of one or more messages by the subscriber device to the publisher device by performing an InfiniBand operation to increment a value stored in a memory unit of the publisher device.

Some embodiments may include, for example, a computer program product including a computer-useable medium including a computer-readable program, wherein the computer-readable program when executed on a computer causes the computer to perform methods in accordance with some embodiments of the invention.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
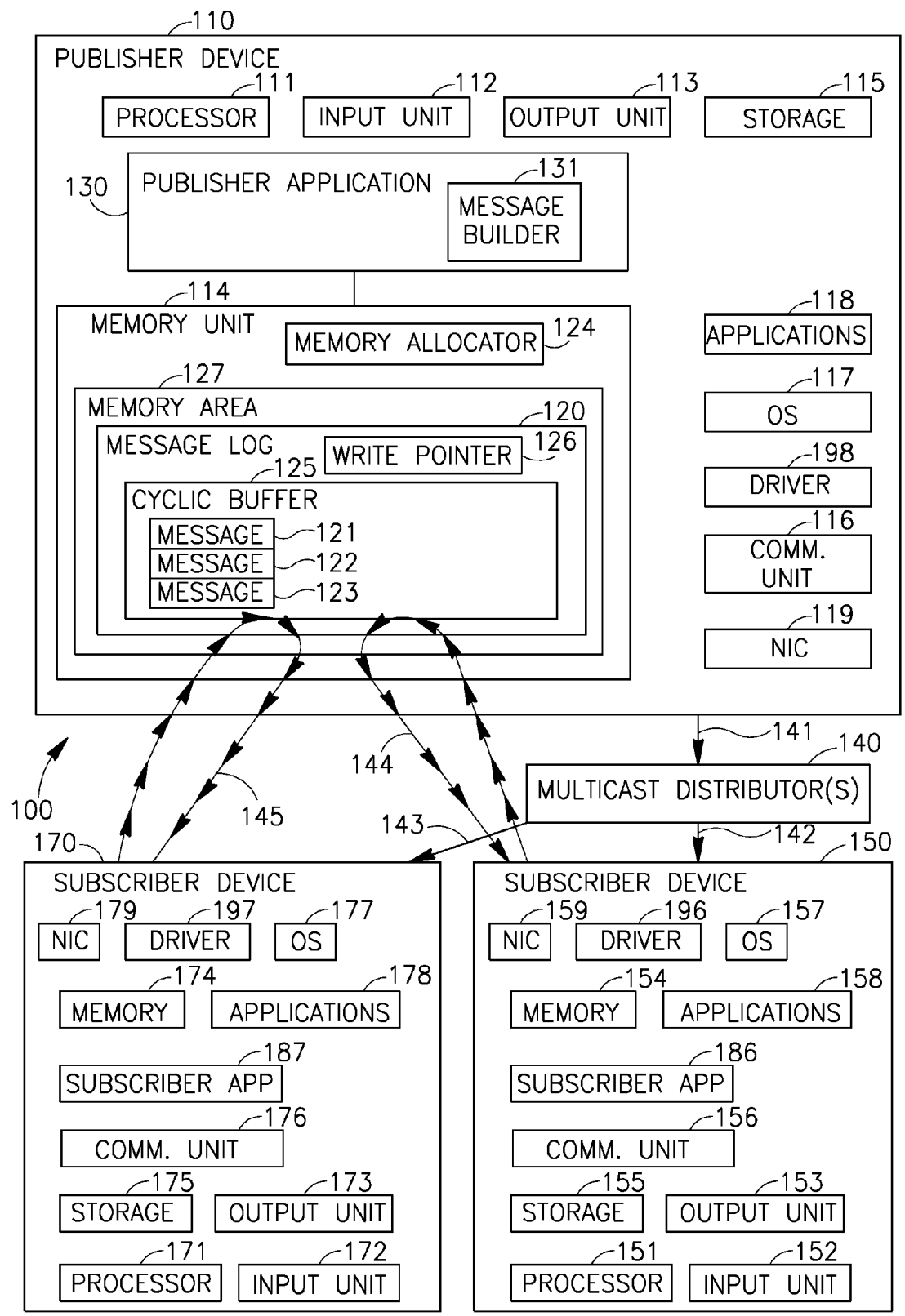
FIG. 1 is a schematic block diagram illustration of a system in accordance with some demonstrative embodiments of the invention.

In the following detailed description, numerous specific details are set forth in order to provide a thorough understanding of some embodiments of the invention. However, it will be understood by persons of ordinary skill in the art that some embodiments may be practiced without these specific details. In other instances, well-known methods, procedures, components, units and/or circuits have not been described in detail so as not to obscure the discussion.

The terms "plurality" or "a plurality" as used herein include, for example, "multiple" or "two or more". For example, "a plurality of items" includes two or more items.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

The term "subscriber" as used herein includes, for example, a remote subscriber, a local subscriber, a remote client, a local client, a data client or data receiver, a subscriber implemented using a Virtual Machine (VM), a subscriber implemented using hardware components and/or software components, a subscriber implemented using a client device or a client computer, or the like.

The term "publisher" as used herein includes, for example, a remote publisher, a local publisher, a remote server, a local server, a data distributor, a publisher implemented using a Virtual Machine (VM), a publisher implemented using hardware components and/or software components, a publisher implemented using a publisher device or a publisher computer, or the like.

The terms "Remote Direct Memory Access" and "RDMA" as used herein include, for example, hardware and/or software and/or infrastructure and/or fabric and/or links and/or adapters and/or architectures, which allow direct hardware access to write from a local memory to a remote or local node's memory and/or to read from a remote or local node's memory to a local node's memory; for example, substantially without involving the Operating System (OS) of the remote computer, or by substantially bypassing the OS of the remote computer. Additionally or alternatively, RDMA may be implemented, for example, substantially without involving the OS of the initiating node, or by substantially bypassing the OS of the initiating node. In some embodiments, RDMA may provide high-throughput, low-latency, zero-copy networking; and may allow a network adapter (e.g., a Network Interface Card (NIC), a Host Channel Adapter (HCA), or the like) to transfer data directly to or from application memory, eliminating the need to copy data between application memory and OS data buffers; as well as eliminating utilization of processors, caches, and/or context switches, and further allowing data transfer simultaneously and/or in parallel with other operations. In some embodiments, the term "RDMA" may include mechanisms or operations that are similar to Remote Direct Memory Access, or that can be used instead of or in addition to Remote Direct Memory Access, for example, iWarp or Direct Data Placement (DPP), which may be used in conjunction with various types of infrastructures, e.g., InfiniBand, Ethernet, or the like.

In some embodiments, the RDMA read operations performed by one or more subscriber devices with regard to a cyclic buffer or a message log of a data publisher, may be used as an exclusive mechanism, or may be used in combination with other mechanisms for data distribution or data corrections, e.g., with multicast transmissions, with multiple unicast transmissions, with a mechanism that combines data "pushing" by the data publisher and data "pulling" by one or more subscribers, or with other suitable mechanisms.

The terms "communication unit" or "Network Interface Card" or "NIC" as used herein include, for example, a Host Channel Adapter (HCA), a RDMA-capable NIC or HCA, an Ethernet NIC or HCA, a NIC or HCA or card or adaptor with TCP offload capabilities, a RDMA-capable hardware component or card or adaptor, a NIC or HCA having OS-bypass capabilities, an InfiniBand NIC or HCA or card or adaptor, an iWarp NIC or HCA or card or adaptor, a card or adaptor able to bypass OS and/or kernel and/or driver(s), a card or adaptor able to directly access a memory of a remote device or server or node, or the like.

The term "Ethernet" as used herein includes, for example, Ethernet, Ethernet in accordance with IEEE 802.3 standard and/or 802.2 standard and/or other standards, Gigabit Ethernet (GEth), 10-Gigabit Ethernet, 100-Gigabit Ethernet, Fast Ethernet, Converged Ethernet, or other types of Ethernet.

The terms "Operating System (OS) bypassing" or "OS bypass" as used herein include, for example, a substantially complete or a partial OS bypassing, a substantially complete or a partial kernel bypassing, a substantially complete or a partial bypass of a driver, or the like. In some embodiments, OS bypass may be implemented by using system calls to OS kernel in order to execute connection control and/or memory registration for RDMA, while send and/or receive operations of data are performed mostly or solely by OS bypass.

The term "multicast" as used herein may include, for example, multicast communication, broadcast communication, wireless multicast communication, wired multicast communication, wireless broadcast communication, wired broadcast communication, multicast communication over the Internet or over a global communication network, broadcast communication over the Internet or over a global communication network, multicast communication using User Datagram Protocol (UDP), broadcast communication using UDP, web-cast communication (e.g., using the World Wide Web), multicast or broadcast communication utilizing InfiniBand, multicast or broadcast communication utilizing Ethernet, multicast or broadcast communication utilizing iWarp, multicast communication utilizing network adaptors with OS bypass capabilities, reliable or unreliable multicast and/or broadcast communication, multicast or broadcast using Transmission Control Protocol (TCP), multicast or broadcast using Internet Protocol (IP), multicast or broadcast using TCP/IP, IP multicast, IP broadcast, multicast or broadcast using kernel UDP socket(s) (e.g., in addition to or instead of using kernel TCP/IP sockets), UDP multicast or broadcast, multicast using a multicast transport protocol or scheme, multiple unicasts, non-unicast communication, and/or other types of communication or schemes to deliver and/or distribute messages or data.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station (BS), a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a "smartphone" device, a wired or wireless handheld device (e.g., BlackBerry®, Palm® Treo™), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), IEEE 802.11 ("Wi-Fi"), IEEE 802.16 ("Wi-Max"), ZigBee™, Ultra-Wideband (UWB), Global System for Mobile communication (GSM), 2G, 2.5G, 3G, Third Generation Partnership Project (3GPP), 3GPP Long Term Evolution (LTE), 3.5G, or the like. Some embodiments may be used in conjunction with various other devices, systems and/or networks.

Although some portions of the discussion herein relate, for demonstrative purposes, to a fast or high-speed interconnect infrastructure, to a fast or high-speed interconnect component or adapter with OS bypass capabilities, to a fast or high-speed interconnect card or Network Interface Card (NIC) with OS bypass capabilities, or to a to a fast or high-speed interconnect infrastructure or fabric, some embodiments are not limited in this regard, and may be used in conjunction with other infrastructures, fabrics, components, adapters, host channel adapters, cards or NICs, which may or may not necessarily be fast or high-speed or with OS bypass capabilities. For example, some embodiments may be utilized in conjunction with InfiniBand (IB) infrastructures, fabrics, components, adapters, host channel adapters, cards or NICs; with iWarp infrastructures, fabrics, components, adapters, host channel adapters, cards or NICs; with Ethernet infrastructures, fabrics, components, adapters, host channel adapters, cards or NICs; with Ethernet TCP offload infrastructures, fabrics, components, adapters, host channel adapters, cards or NICs; with Ethernet (e.g., Fast Ethernet, Gigabit Ethernet (GEth), 10-Gigabit Ethernet, 100-Gigabit Ethernet, or other types of Ethernet) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs that have OS-bypass capabilities; with infrastructures, fabrics, components, adapters, host channel adapters, cards or NICs that are connectionless and/or stateless; and/or other suitable hardware.

FIG. 1 schematically illustrates a block diagram of a message distribution system 100 in accordance with some demonstrative embodiments. System 100 includes one or more publisher servers or publisher devices, for example, a publisher device 110. System 100 further includes one or more data receivers or subscriber devices, for example, subscriber devices 150 and 170.

Although FIG. 1 shows, for demonstrative purposes, one publisher device 110, other numbers of publisher devices may be used. Similarly, although FIG. 1 shows, for demonstrative purposes, two subscriber devices 150 and 170, other numbers of subscriber devices may be used.

Publisher device includes one or more publisher applications, for example, a publisher application 130. Subscriber device 150 includes one or more subscriber applications, for example, a subscriber application 186. Similarly, subscriber device 170 includes one or more subscriber applications, for example, a subscriber application 187.

Although FIG. 1 shows, for demonstrative purposes, one publisher application 130, other numbers of publisher applications may be used or may be included in publisher device 110 and/or in additional publisher devices. Similarly, although FIG. 1 shows, for demonstrative purposes, one subscriber application 186 in the subscriber devices 150, and one subscriber application 187 in the subscriber device 170, other numbers of subscriber applications may be used or may be included in subscriber devices 150 and/or 170.

Publisher device 110 includes, for example, a processor 111, an input unit 112, an output unit 113, a memory unit 114, a storage unit 115, and a communication unit 116. Publisher device 110 may optionally include other suitable hardware components and/or software components. Publisher device 110 may be implemented, for example, using a computing platform or a server computer.

Processor 111 may include, for example, a Central Processing Unit (CPU), a Digital Signal Processor (DSP), one or more processor cores, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 may execute instructions, for example, of an Operating System (OS) 117 of publisher device 110 or of one or more software applications 118.

Input unit 112 may include, for example, a keyboard, a keypad, a mouse, a touch-pad, a track-ball, a track-wheel, a thumb-wheel, a scroll-wheel, a stylus, one or more buttons or sliders, a microphone, or other suitable pointing device or input device.

Output unit 113 may include, for example, a monitor, a screen, a Cathode Ray Tube (CRT) display unit, a Liquid Crystal Display (LCD) display unit, a plasma display unit, a projector, a projection device, a television, a High Definition Television (HDTV) display unit, one or more audio speakers, or other suitable output devices.

Memory unit 114 may include, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units or storage units.

Storage unit 115 may include, for example, a hard disk drive, a floppy disk drive, a Compact Disk (CD) drive, a CD-ROM drive, a Digital Versatile Disk (DVD) drive, a magnetic storage device, an optical storage device, a storage device utilizing removable storage mediums or storage articles, or other suitable removable or non-removable storage units.

Communication unit 116 may include, for example, a wired or wireless Network Interface Card (NIC), a Host Channel Adaptor (HCA), an InfiniBand HCA, a wired or wireless modem, a wired or wireless router or switch or hub, a wired or wireless receiver and/or transmitter, a wired or wireless transmitter-receiver and/or transceiver, a Radio Frequency (RF) communication unit or transceiver, or other units able to transmit and/or receive signals, blocks, frames, transmission streams, packets, messages and/or data. Optionally, communication unit 116 may include, or may be associated with, one or more antennas, for example, a dipole antenna, a monopole antenna, an omni-directional antenna, an end fed antenna, a circularly polarized antenna, a micro-strip antenna, a diversity antenna, or the like.

Publisher device 110 further includes a NIC 119, for example, a fast or high-speed interconnect card or adapter or Host Channel Adapter (HCA); a NIC or HCA having OS bypass and/or RDMA capabilities; an InfiniBand (IB) NIC or HCA; an Ethernet NIC or HCA; an Ethernet (e.g., Fast Ethernet, Gigabit Ethernet (GEth), 10-Gigabit Ethernet, Converged Ethernet NIC (C-NIC), 100-Gigabit Ethernet, or other types of Ethernet) NIC or HCA; a NIC or HCA that allows a user-mode application to directly access hardware, and/or to directly access remote hardware (e.g., using RDMA); an RDMA-capable NIC or HCA; a NIC or HCA that allows a user-mode application to bypass call(s) to a local OS and/or to an OS of a remote device; a connectionless and/or stateless NIC or HCA; and/or other suitable hardware. Optionally, NIC 119 may be associated with a driver 198, for example, a software module or an interface allowing other software components of the publisher device (e.g., the OS 117 or the applications 118) to interact with the NIC 119. In some embodiments, NIC 119 may be part of communication unit 116, or may be separate from communication unit 116.

In some embodiments, the components of publisher device 110 may be enclosed in a common housing or packaging, and may be interconnected or coupled or operably associated using one or more wired or wireless links. In other embodiments, components of publisher device 110 may be distributed among multiple or separate devices or locations, may be implemented using a client/server configuration, or may communicate using remote access methods.

Subscriber device 150 includes, for example, a processor 151, an input unit 152, an output unit 153, a memory unit 154, a storage unit 155, a communication unit 156, an OS 157, one or more software applications 158, and a NIC 159 optionally associated with a driver 196.

Similarly, subscriber device 170 includes, for example, a processor 171, an input unit 172, an output unit 173, a memory unit 174, a storage unit 175, a communication unit 176, an OS 177, one or more software applications 178, and a NIC 179 optionally associated with a driver 197.

Publisher device 110 is able to initiate multicast of messages to multiple subscriber devices, for example, to subscriber devices 150 and/or 170. For example, one or more multicast groups may be defined, corresponding to one or more multicast streams; and subscriber device 150 and/or 170 may register to selected multicast group(s).

In some embodiments, for example, the NIC 119 of publisher device 110 may be connected to the NIC 159 of subscriber device 150 through a link, and the NIC 119 of publisher device 110 may be connected to the NIC 179 of subscriber device 170 through a link. These links may include, for example, a fast or high-speed interconnect link; a link able to allow OS bypassing; an InfiniBand (IB) link; an Ethernet (e.g., Fast Ethernet, Gigabit Ethernet (GEth), 10-Gigabit Ethernet, 100-Gigabit Ethernet, or other types of Ethernet) link; a link that allows a user-mode application of the subscriber device 150 or 170 to directly access hardware (e.g., memory unit 114) of the publisher device 110; a link that allows a user-mode application of the subscriber device 150 or 170 to utilize RDMA in order to directly access remote hardware (e.g., memory unit 114) of the publisher device 110; an RDMA-capable link; a link that allows a user-mode application of the subscriber device 150 or 170 to bypass call(s) to a local OS and/or to an OS of a remote device; a link that allows connectionless and/or stateless communication; and/or other suitable wired or wireless links, fabrics, or infrastructures.

The publisher device 110 defines that at least a portion or area of the memory unit 114 is directly accessible to the subscriber devices 150 and 170, for example, using RDMA. For example, a first portion or area of the memory unit 114 is defined as non-accessible or non-readable by the subscriber devices 150 and 170; whereas a second portion or area (e.g., a memory area 127) of the memory unit 114 is defined as directly accessible and/or directly readable by the subscriber devices 150 and 170. For example, memory area 127 of the memory unit 114 of publisher device 110 is defined or allocated as RDMA-accessible with respect to subscriber devices 150 and/or 170. The allocation may be performed, for example, by a memory allocator 124 which may be implemented as part of memory unit 114, as a software module, as a hardware component (e.g., a memory controller, a processor, or the like), or as a combination thereof.

In some embodiments, registration of the subscriber devices 150 and 170 may be performed, for example, by the NIC 119 of publisher device 110, which may be implemented as an Infiniband HCA unit or Ethernet NIC, optionally utilizing a software module, a hardware component (e.g., a memory controller, a processor, or the like), or a combination thereof. For example, an initialization phase may optionally include registration of subscriber devices 150 and/or 170 (e.g., as being able and authorized to remotely and directly read from the memory area 127), and/or registration of the remote NICs 159 and/or 179 (e.g., as being able and authorized to remotely and directly read from the memory area 127).

Publisher device 110 defines or creates a message log 120, in the memory area 127 of the memory unit 114. The message log 120 is utilized by the publisher application 130 in order to store discrete or separate messages that are multicast to subscriber devices 150 and 170, and in order to allow a subscriber device 150 or 170 to directly, autonomously, and independently read from the message log 120 (e.g., using RDMA) one or more messages that were not entirely, successfully and/or correctly received by the subscriber device 150 or 170.

For example, message log 120 may include a buffer, e.g., a cyclic buffer 125 able to store multiple messages, which may not necessarily have identical message sizes. For demonstrative purposes, three messages 121-123 are shown in FIG. 1 stored in the cyclic buffer 125, as further discussed herein. Optionally, the publisher application 130 may utilize a write pointer 126, to track the location in the message log 120 to which a subsequent message is to be written. For example, the write pointer 126 is used to point to the next record in the cyclic buffer 125 into which writing is expected to be performed; other tracking or pointing methods may be used. Optionally, a wrap-around handling mechanism may be used with respect to cyclic buffer 125.

The publisher application 130 manages the publication of multiple messages to subscriber devices 150 and 170. For example, publisher application 130 includes, or is associated with, a message constructor or message builder 131, able to construct or build discrete or separate messages from data or raw data, which may be optionally received from an internal and/or external data source or from one or more incoming data streams. In some embodiments, publisher application 130 may optionally include, for example, a front-end module to receive information (e.g., raw or pre-formatted) from an external source; a converter or re-formatter to re-format the information in accordance with pre-defined formatting rules; and a writing component to write messages into the message log 120.

For each message intended for multicasting, the message builder 131 creates a message header that includes, for example: a message sequence number; a virtual address (e.g., of memory area 127 or memory unit 114) that corresponds to the memory location in which the message (or a copy thereof) is stored; a message size (e.g., in bytes); and other suitable data.

As a demonstrative example, a first message 121 is constructed by the message builder 131. The first message 121 is written by the publisher application 130 into the message log 120. Subsequent to, or in parallel to, writing the message 121 into the message log 120, the publisher device 110 initiates a multicast of the message 121 to the subscriber devices that are included in the relevant multicast group through the use of communication unit 116 or NIC 119. For example, the multicast of the message 121 may utilize one or more intermediary devices or multicast distributor(s) 140 which may re-route or re-transmit the message 121, thereby transferring the message 121 from the publisher device 110 through network fabric to the subscriber devices 150 and 170, e.g., using communication links 141-143. The message 121 is successfully received by subscriber device 150; the message 121 is stored locally in the memory unit 154, and/or is otherwise handled by the subscriber application 186 of subscriber device 150. Similarly, the message 121 is successfully received by subscriber device 170; the message 121 is stored locally in the memory unit 174, and/or is otherwise handled by the subscriber application 187 of subscriber device 170.

As a demonstrative example, subsequently, a second message 122 is constructed by the message builder 131. The second message 122 is written by the publisher application 130 into the message log 120. Subsequent to, or in parallel to, writing the message 122 into the message log 120, the publisher device 110 initiates a multicast of the message 122 to the subscriber devices that are included in the relevant multicast group. The message 122 is successfully received by subscriber device 150; the message 150 is stored locally in the memory unit 154, and/or is otherwise handled by the subscriber application 186 of subscriber device 150. However, the message 122 is not successfully received by the subscriber device 170.

A third message 123 is constructed by the message builder 131. The third message 123 is written by the publisher application 130 into the message log 120. Subsequent to, or in parallel to, writing the message 123 into the message log 120, the publisher device 110 initiates a multicast of the message 123 to the subscriber devices that are included in the relevant multicast group. The message 123 is successfully received by subscriber device 150; the message 123 is stored locally in the memory unit 154, and/or is otherwise handled by the subscriber application 186 of subscriber device 150. Similarly, the message 123 is successfully received by subscriber device 170; the message 123 is stored locally in the memory unit 174, and/or is otherwise handled by the subscriber application 187 of subscriber device 170.

The subscriber application 187 of subscriber device 170 tracks and manages the reception of messages. For example, the subscriber application 187 analyses the header of each incoming message, in order to determine whether one or more messages are missing, were "dropped", were not received correctly or fully, or otherwise failed to be received successfully. For example, the subscriber application 187 checks whether or not the sequence numbers of incoming messages are consecutive, thereby identifying one or more missing messages. Similarly, the subscriber application 187 checks whether or not the actual size of a received message is identical to an expected message size as represented in the header of the received message, thereby identifying an incoming messages that is truncated or otherwise erroneous.

The subscriber application 187 analyzes the headers of incoming messages. In a demonstrative example, messages 121 and 123 were successfully received by subscriber device 170, whereas message 122 was not successfully received by subscriber device 170. The subscriber application 122 is able to determine that a message (namely, message 122) was not successfully received, by detecting that the sequence number of message 123 is not consecutive to the sequence number of message 121; the difference between the sequence numbers indicates to the publisher application that one message (namely, message 122) is missing.

The subscriber application 187 is able to autonomously and directly retrieve the missing message (namely, message 122), by directly reading the missing message from the remote message log 120, for example, using RDMA. The subscriber device 187 is authorized to perform RDMA read operations from the message log 120. The publisher application 187 determines the exact or approximate virtual memory address in the message log 120, from which the missing message is to be directly read. For example, in some embodiments, the header of message 121 includes a first value representing the virtual memory address of the beginning of message 121 in the message log 120, and further includes a second value representing the size of message 121. The sum of these two values corresponds to the virtual memory address of the beginning of the next consecutive message (namely, message 122) in the message log 120. This sum is autonomously calculated by the subscriber application 187 of subscriber device 170, based on the information included in the header of message 122 which was successfully received by subscriber device 170. Accordingly, the subscriber application 187 may autonomously determine the virtual address in the remote message log 120 from which the missing message (namely, message 122) is to be directly read using RDMA.

In some embodiments, other suitable calculations may be used by the subscriber application 187 in order to determine the virtual memory address from which missing message(s) are to be directly read using RDMA. For example, in some embodiments, the header of message 121 may optionally include a value representing the virtual memory address in message log 120 in which the consecutive message 122 begins. In other embodiments, particularly if a series of messages were not successfully received, the subscriber application 187 may initiate a direct read of a batch of messages, optionally using an approximate virtual memory range, and may then retrieve the missing messages from the range of virtual memory that was remotely read using RDMA. Other suitable mechanisms may be used.

In some embodiments, optionally, the message header of a message in the message log 120 may include a "magic number" indicating the existence of a valid message.

The autonomous, independent, and/or direct reading of missing messages or corrupted messages from the message log 120 may be performed using RDMA, for example, as indicated by links 144 and 145. The RDMA read operation is initiated by the subscriber device 170, without a need to obtain specific approval of the publisher device 110 for each specific RDMA read operation. Optionally, the RDMA read operation is performed while bypassing the OS 117 and the driver 198 of publisher device 110. For example, an RDMA, OS-bypassing, driver-bypassing pull is performed by subscriber device 150 in order to read messages from the message log 120.

In some embodiments, the retrieval of missing messages or corrupted messages from the message log may be performed, for example, in parallel to reception of further multicast messages or other incoming multicast data, and may not interfere with the incoming multicast which may continue to deliver additional separate messages to the subscriber devices 150 and/or 170.

In some embodiments, the message log 120 is created in an RDMA-accessible portion of memory unit 114. For example, in an initial registration phase, the message log 120 is defined, allocated, and registered towards the NIC 119 of publisher device 110, and/or with respect to NIC 159 and/or NIC 179. The registration indicates that subscriber devices 150 and/or 170 are allowed to perform RDMA read operations to pull data from the message log 120, which resides in the RDMA-accessible memory area 127 of memory unit 114.

In some embodiments, for example, publisher application 130 receives substantially real-time information related to stock exchange transactions of a stock (e.g., recent transactions information), and writes such information as separate messages into the cyclic buffer 125 of message log 120. For example, information of a first transaction of the stock is written as first message 121 into a record of the cyclic buffer 125 of message log 120; and information of a second transaction of the stock is written as second message 122 into another record of the cyclic buffer 125 of message log 120.

In some embodiments, the cyclic buffer 125 may have a constant size; in other embodiments, the size of the cyclic buffer 125 may be modifiable, and/or may be dynamically modified. For example, the size of cyclic buffer 125 may be calculated, set, or updated based on past utilization of the cyclic buffer 125, based on an analysis of past performance, based on an estimate of the expected utilization of the cyclic buffer 125, based on specific implementation requirements, or the like. In some embodiments, a linked list of cyclic buffers may be used, or other mechanisms may be used to manage the cyclic buffer 125, to handle the updating or advancement of the write pointer 126, to handle wraparounds, or the like.

In some embodiments, publisher device 110 may have writing privileges (e.g., local write) and reading privileges (e.g., local read) with respect to cyclic buffer 125; whereas subscriber devices 150 and/or 170 may have only reading privileges (e.g., RDMA read) with respect to cyclic buffer 125.

In some embodiments, variable message size may be used, such that a first message may have a first size, and a second message may have a second, different, size. In other embodiments, a constant or substantially constant message size may be used; for example, messages may be pre-formatted to accommodate a pre-defined message size, optionally appending null values to the message if the message size is smaller than the constant message size.

In some embodiments, system 100 may be used in an environment in which the network fabric is at least partially unreliable for multicast operations, while the network fabric supports RDMA and ensures the integrity of delivered data. In some embodiments, for example, each multicast group (e.g., IP multicast, UDP multicast, or other types of multicast) represents a multicast stream; the data distributor (namely, the publisher device 110) selects a multicast group for data distribution; and the publisher device allocates a local memory area (namely, memory area 127) for message logging using an RDMA-accessible message log 120. A matching mechanism allows each data receiver, for example, subscriber devices 150 and 170, to register to selected multicast group(s) and to establish an RDMA connection (e.g., allowing an RDMA read) with the publisher device (namely, publisher device 110) of the selected multicast group(s).

In some embodiments, the publisher device 110 distributes messages, by first writing the message to the message log 120, and then performing a multicast send operation towards the network fabric, optionally utilizing an OS-bypass capable API (e.g., if the network fabric host's API support this feature, for example, using InfiniBand). In some embodiments, optionally, multiple messages may be grouped or batched prior to sending, and may be multicast as a batch or group of messages.

In some embodiments, the header of each message sent in the multicast send operation includes, among other data items, the following information: a message sequence number; a message virtual address in the message log 120; and a message size.

The message log 120 is managed and maintained by the publisher device 110; for example, one message log 120 may be used for each multicast stream. The message log 120 may be implemented using cyclic buffer 125, and is exposed to RDMA read operations for substantially all the subscriber devices of that multicast stream. The size of the message log 120 defines the depth of data loss recovery.

In some embodiments, each subscribe device 150 or 170 performs a multicast receive operation towards the network fabric, optionally using an OS bypass capable API (e.g., if the network fabric host's API and communication unit support this feature, for example, using InfiniBand). For each received message, the subscriber device 150 or 170 checks the message sequence number. If message loss is detected, the subscriber device 150 or 170 issues an RDMA read operation directly towards the virtual address of the lost message, located in the message log 120 of the publisher device 110. The virtual address of the lost message is autonomously calculated by the subscriber device 150 or 170, for example, using information in the last received message header. In some embodiments, the subscriber device 150 or 170 checks the sequence number of the message that was read using RDMA read, in order to verify that the depth of the message loss recover is not exceeded.

In some embodiments, the publisher device 110 may optionally send a "heart bit" control message to notify details of the last sent message, in order to improve detection of possible message loss by subscriber devices 150 and 170. For example, the "heart bit" control message may include the sequence number of the last (e.g., most recent) message sent, as well as its size and virtual address in the message log 120.

Some embodiments may improve network fabric stability, and/or may reduce or minimize network congestion. For example, some embodiments may not require any re-transmissions (e.g., of lost messages), and thus avoid a "multicast storm". In some embodiments, each message is propagated (using multicast) only once per path. In some embodiments, recover of lost messages is performed using unicast operation utilizing RDMA read, such that only the relevant subscriber devices individually and separately retrieve and receive the lost message(s).

Some embodiments may provide offload and/or scalability to the publisher device 110 and/or the publisher application 130. For example, message distribution is performed using multicast, optionally using a fast interconnect network fabric, and optionally supporting a virtually unlimited number of subscriber devices; and the publisher device 110 is not required to send messages using multiple unicast operations. Optionally, the data Send( ) operation may be performed using OS bypass, directly from the publisher application 130 to the NIC 119 or other suitable hardware. Data reliability is efficiently maintained by logging the sent messages into the message log 120 implemented in the local memory of the publisher device 110, which is RDMA-accessible to subscriber devices for independent retrieval of lost messages. Accordingly, the publisher device 110 may not be required to use Acknowledgment (ACK) or Negative Acknowledgement (NACK) messages, control messages, timers, or other ACK/NACK mechanisms for data reliability.

Some embodiments may provide offload to the subscriber device 150 and/or the subscriber application 186. For example, the data Receive( ) operation may be performed using OS bypass, directly from the subscriber application 186 to the NIC 159 or other suitable hardware. Data reliability is efficiently maintained using the message log 120 implemented in the local memory of the publisher device 110, which is RDMA-accessible to the subscriber device 150 for independent retrieval of lost messages. Accordingly, the subscriber device 150 may not be required to use Acknowledgment (ACK) or Negative Acknowledgement (NACK) messages, control messages, timers, or other ACK/NACK mechanisms for data reliability.

Some embodiments may utilize API which fully supports OS bypass and "zero copy" in the publisher side and/or the subscriber side. Some embodiments may efficiently support mass distribution of small-sized messages with reduced or minimal latency; for example, in some embodiments, messages may be distributed individually and need not be batched or grouped (e.g., prior to distribution) in order to reach efficient operation. Some embodiments may provide reduced or minimum variance, as substantially each message is sent upon message construction or reception from outside source and without delays, and the publisher Send( ) operation sends the message directly to the network fabric.

In some embodiments, system 100 may be used for mission-critical publishing that requires reliable delivery of data in substantially real-time. In some embodiments, for example, system 100 may be used in conjunction with stock exchange data, history data of stock transactions, stock trading data, trading data of various commodities and/or financial instruments (e.g., securities, options, or the like), banking data, monetary data, money transfer data, gambling-related data, sports-related data (e.g., scores, rankings, or the like), data including a large amount of alerts or "log entries" generated by a computing system or network, or the like.

In some embodiments, system 100 may be used in conjunction with a single producer or publisher of information (e.g., publisher device 110) and multiple subscribers or consumers of information (e.g., subscriber devices 150 and 170). Multiple RDMA read operations associated with multiple clients or subscriber devices, may coalesce to allow rapid performance of system 100 and a smaller overhead for publisher device 110.

In some embodiments, different subscriber devices may have different reading privileges with respect to different message log(s) or with respect to different cyclic buffer(s). For example, subscriber device 170 may be authorized to directly read messages from a first message log associated with a first multicast group or stream, or associated with a first publisher application or publisher device; whereas subscriber device 150 may be authorized to directly read messages from a second message log associated with a second multicast group or stream, or associated with a second publisher application or publisher device.

In some embodiments, system 100 may not include and may not utilize a timing scheme, a synchronization scheme, a pace scheme, a pre-defined pace (e.g., dictated by the publisher device 110), or other coupling scheme in order to synchronize between the publisher device 110 and one or more subscriber devices 150 and/or 170. Some embodiments thus allow substantially full de-coupling, partial de-coupling, or only "loose" coupling, between the publisher device 110 and the subscriber devices 150 and/or 170. Some embodiments may not include and may not utilize a runtime control channel (e.g., that ensures reliability of data delivery), a reliability management scheme, an application-level ACK or NACK mechanism, or the like.

In some embodiments, subscriber device 150 may autonomously perform RDMA read operations in order to read message(s) from message log 120 of publisher device 110, for example, independently of subscriber device 170 or other subscriber device(s), independently of other read operations of other subscriber device(s), independently of other RDMA read operations of other subscriber device(s), independently of other operations of other subscriber device(s) which may access the message log 120, independently of other operations of other subscriber device(s), independently of a timing scheme or a control scheme or a control channel, without a need to request and/or to receive ad-hoc authorization or per-transaction authorization or per-read-operation authorization from the publisher device 110 for retrieval of lost message(s), at a time determined exclusively by the subscriber device 150, independently from similar or different schemes for retrieval of lost messages which may be utilized by other subscriber devices, independent of non-RDMA schemes which may be used by other subscriber devices to retrieve lost messages, or the like.

In some embodiments, the OS 117 (or portions thereof) is utilized in some functions or in some phases of operation, for example, during an initialization phase, for privileged operations or control operations; whereas the OS 117 (or portions thereof) is bypassed for other functions or in other phases of operation, for example, in the pulling of messages from the message log 120 using RDMA.

In some embodiments, optionally, one or more components of system 100 may be used as a proxy device, for example, in order to re-distribute or re-publish messages and to achieve or increase "fan-out". In some embodiments, optionally, one or more components of system 100 may support multiple mechanisms for message distribution, for example, multicast, multiple unicasts, RDMA read of lost messages, "push" mechanisms, "pull" mechanisms, and/or "legacy" distribution mechanisms. Components of system 100 may be used, for example, as part of a multi-tier publishing system or a multi-tier messaging system.

In some embodiments, a virtual memory address may be utilized in order to allow the subscriber device(s) 150 or 170 to directly read a lost message stored in the message log 120. In other embodiments, other suitable pointing or referencing mechanisms may be used, for example, an offset, a tag, a pointer, or the like.

Some embodiments may utilize an acknowledgment indication sent from the subscriber device(s) 150 or 170 to the publisher device 110, for example, in order to notify the publisher device 110 on successful accomplishment of message reception. The acknowledgement indication may be sent in one or more suitable ways. For example, in some embodiments, the acknowledgement indication may be sent using a unicast message from the subscriber device 150 or 170 to the publisher device 110, indicating successful reception of a message or a batch of messages. In other embodiments, the acknowledgement indication may be implemented using a RDMA write operation from the subscriber device 150 or 170 to the memory area 127 of the publisher device 110, indicating successful reception of a message or a batch of messages. In still other embodiments, the acknowledgement indication may be implemented using an atomic operation (e.g., an atomic InfiniBand operation, an atomic Ethernet operation, or the like), which increments a value stored in a memory unit 114 of the publisher device 110, for example, such that each subscriber device 150 or 170 may increment the same memory area; the publisher device 110 may determine that all the subscriber devices received the message once the value stored in this memory area reaches the total number of subscriber devices; this may be performed with regard to single messages, or with regard to a batch of messages. Other suitable mechanisms may be used.

Figure 2:
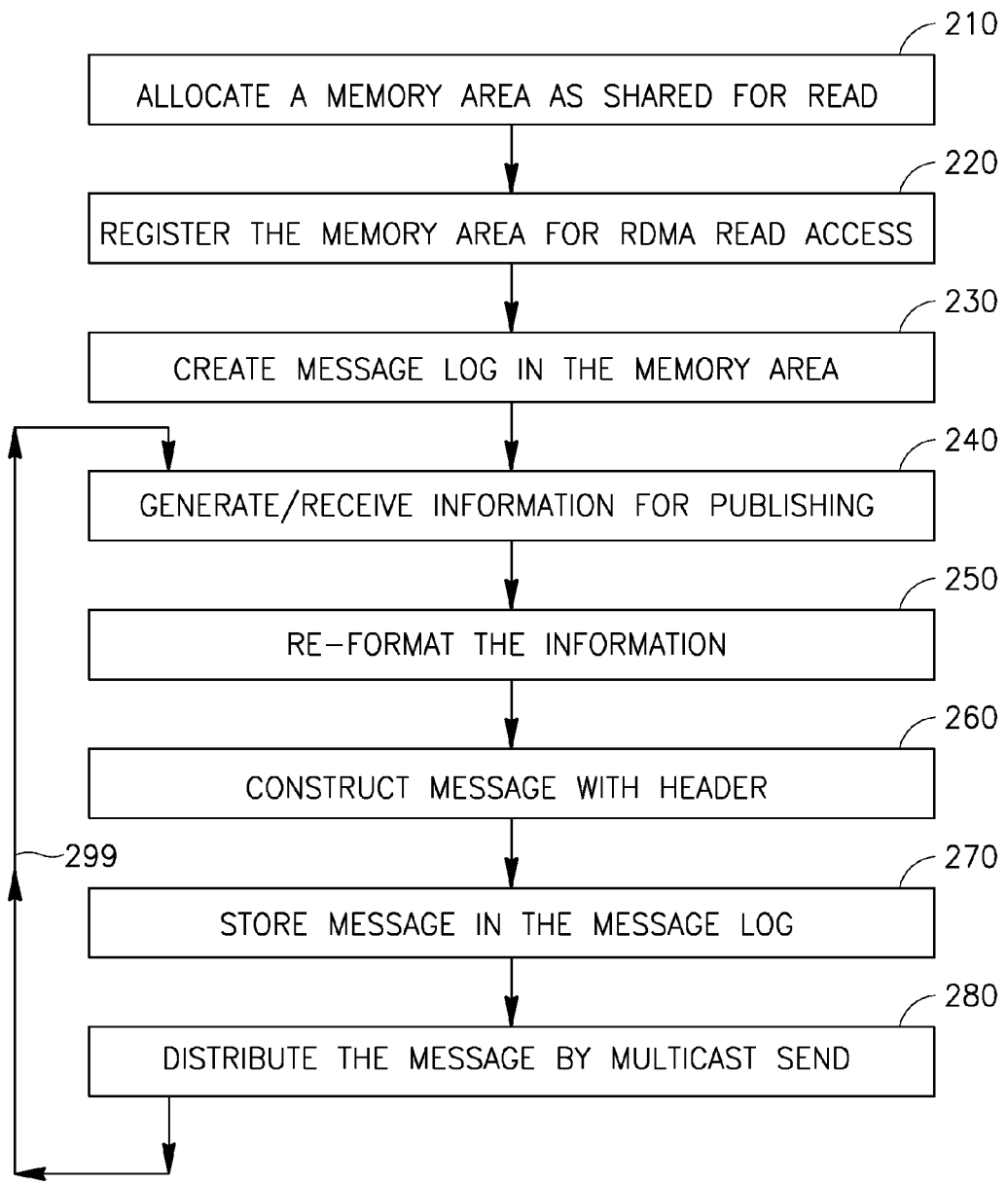
FIG. 2 is a schematic flow-chart of a method of distributing messages to multiple subscriber devices, in accordance with some demonstrative embodiments of the invention.

FIG. 2 is a schematic flow-chart of a method of distributing messages to multiple subscriber devices, in accordance with some demonstrative embodiments of the invention. Operations of the method may be used, for example, by system 100 of FIG. 1, by publisher device 110 of FIG. 1, and/or by other suitable units, devices and/or systems.

In some embodiments, the method may include, for example, allocating a memory area of a local memory unit of a publisher device as shared and accessible for direct, on-demand, "pull"-type read operations by one or more subscriber devices that belong to a multicast group (block 210).

In some embodiments, the method may include, for example, registering the memory area for RDMA read access by one or more of the subscriber devices (block 220).

In some embodiments, the method may include, for example, creating a message log in the memory area to store copies of messages that are sent to the multicast group (block 230).

In some embodiments, the method may include, for example, generating or receiving information intended to be published to the multiple subscriber devices (block 240).

In some embodiments, the method may optionally include, for example, re-formatting or normalizing the information into message payload in accordance with pre-defined formatting rules or message normalization rules (block 250).

In some embodiments, the method may include, for example, constructing a message intended for distribution (block 260). This may include, for example, constructing a message header, and adding the message header to the message payload. For example, the message header indicates at least: the message sequence number; the message size; and a virtual address in the publisher's message log in which a copy of the message is stored.

In some embodiments, the method may include, for example, storing the constructed message in the message log (block 270), at the memory address indicated in the message header.

In some embodiments, the method may include, for example, distributing the message to one or more subscriber devices, e.g., by performing a multicast send operation (block 280). This may be performed, for example, using OS-bypassing, using driver bypassing, over a high-throughput low-latency fabric or infrastructure (e.g., InfiniBand), or the like.

Lost message(s) may be identified by subscriber devices, for example, based on non-consecutive sequence numbers of message headers of received messages. Such lost message(s) may be autonomously and independently retrieved by subscriber devices, by performing a RDMA read operation to the message log of the publisher device, based on virtual memory address obtained from previously-received message header(s).

In some embodiments, the storing of block 270 may be performed prior to the distributing of block 280; the storing of block 270 may be performed substantially immediately after the distributing of block 280; or the storing of block 270 may be performed concurrently with, or in parallel to, the distributing of block 280.

In some embodiments, as indicated by arrow 299, the operations of blocks 240 to 280 may be repeated multiple iterations, and each iteration may correspond to a distribution of a message or a batch of messages.

In some embodiments, the operations of blocks 210 to 230 may correspond to an initialization of the publisher device; whereas the operations of blocks 240 to 280 may correspond to the ongoing publishing of messages by the publisher device.

Other suitable operations or sets of operations may be used in accordance with some embodiments.

Figure 3:
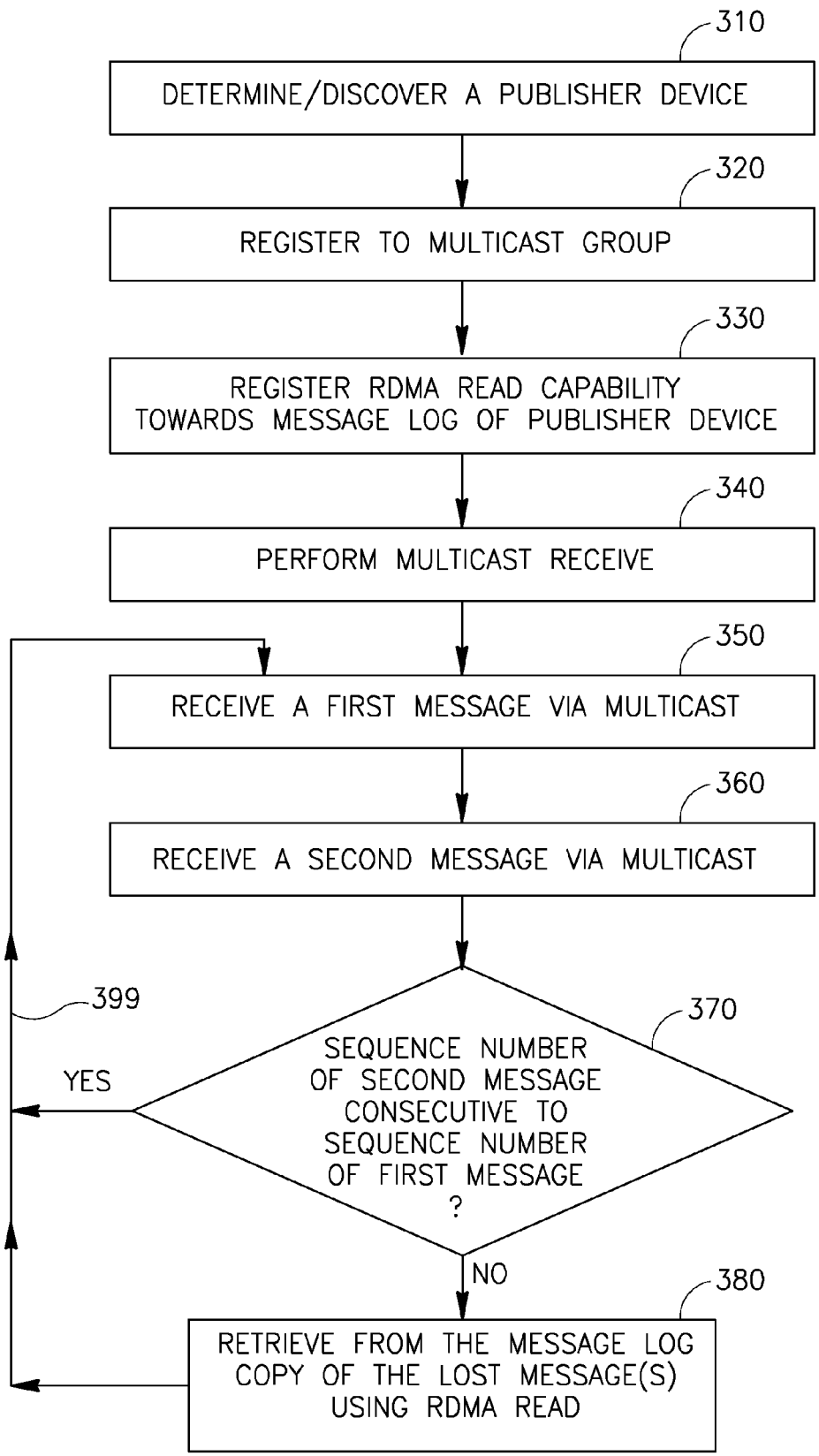
FIG. 3 is a schematic flow-chart of a method of receiving messages by a subscriber device, in accordance with some demonstrative embodiments of the invention.

FIG. 3 is a schematic flow-chart of a method of receiving messages by a subscriber device, in accordance with some demonstrative embodiments of the invention. Operations of the method may be used, for example, by system 100 of FIG. 1, by subscriber device 150 or 170 of FIG. 1, and/or by other suitable units, devices and/or systems.

In some embodiments, the method may include, for example, determining or discovering a publisher device associated with a multicast group (block 310).

In some embodiments, the method may include, for example, registering to the multicast group (block 320).

In some embodiments, the method may include, for example, registering a RDMA read capability towards a message log of the publisher device (block 330).

In some embodiments, the method may include, for example, performing a multicast receive operation (block 340).

In some embodiments, the method may include, for example, receiving a message ("first message") from the multicast stream (block 350).

In some embodiments, the method may include, for example, receiving another message ("second message") from the multicast stream (block 360).

In some embodiments, the method may include, for example, checking whether or not the message sequence number indicated in the header of the second message, is consecutive to the message sequence number indicated in the message header of the first message (block 370).

If the message sequence number indicated in the header of the second message is not consecutive to the message sequence number indicated in the header of the first message, then the method may include retrieving a copy of one or more lost messages from the message log of the publisher device, using a RDMA read operation (block 380). The virtual memory address for the RDMA read operation may be obtained from message header(s) previously received by the subscriber device or by using the "heart bit" mechanism. The RDMA read operation may be performed using OS-bypassing, using driver bypassing, using RDMA read operations, over a high-throughput low-latency fabric or infrastructure (e.g., InfiniBand), or the like.

In contrast, if the message sequence number indicated in the header of the second message is consecutive to the message sequence number indicated in the header of the first message, then the method may include continuing to receive messages of the multicast stream.

In some embodiments, the method may include, continuing to receive message(s) of the multicast stream (arrow 399), for example, by, repeating the operations of blocks 350 and onward with respect to incoming messages.

In some embodiments, the operations of blocks 310 to 340 may correspond to an initialization of the subscriber device; whereas the operations of blocks 350 to 380 may correspond to the ongoing reception of messages by the subscriber device.

Other suitable operations or sets of operations may be used in accordance with some embodiments.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the following claims are intended to cover all such modifications, substitutions, changes, and equivalents.

What is claimed is:

1. A data publisher for communicating with a plurality of subscriber devices via a network fabric, the data publisher comprising:

a memory allocator to allocate a memory area of a local memory unit of the data publisher to be accessible for Remote Direct Memory Access (RDMA) read operations by one or more of the subscriber devices; and a publisher application configured (a) to create a message log in said memory area, (b) to send messages to subscriber devices using a multicast transport protocol, and (c) to store in said memory area copies of said messages;

a message builder to insert, into a header each message that is sent to subscriber devices using the multicast transport protocol, information that allows a subscriber device to (A) autonomously calculate a virtual memory address in the message log of the publisher device, at which a copy of a missing message is stored, the missing message comprising a multicast message that was sent by the publisher device using the multicast transport protocol after a first message received by the subscriber device and before a second message received by the subscriber device; (B) autonomously perform one or more RDMA read operations to autonomously retrieve said missing message from said message log of the publisher device, without utilizing control messages and without obtaining a specific approval of the publisher device for performing the one or more RDMA read operations; (C) retrieve the missing message via RDMA in parallel to reception of further one or more multicast messages from the publisher device;

wherein the data publisher is implemented by utilizing at least a hardware component.

2. The data publisher of claim 1, wherein one or more of the subscriber devices are authorized by the data publisher to read one or more messages stored in said memory area using one or more RDMA read operations independently of access to said memory area by other subscriber devices.

3. The data publisher of claim 1, wherein the memory area comprises a cyclic buffer able to store copies of messages sent using the multicast transport protocol by the publisher application to the subscriber devices.

4. The data publisher of claim 1, wherein the header comprises:
   a value indicating a sequence number of said message;
   a value indicating a size of said message; and
   a value indicating a virtual memory address of a memory location of said memory area in which the copy of said message is stored.

5. The data publisher of claim 1, wherein the header comprises:
   a value indicating a sequence number of said message; and
   a value indicating a virtual memory address of said memory area in which a copy of a message consecutive to said message is stored.

6. The data publisher of claim 1, wherein the publisher application is to send said message using the multicast transport protocol through InfiniBand hardware.

7. The data publisher of claim 1, wherein the publisher application is to send said message by one or more operations that bypass an Operating System (OS) of the data publisher.

8. The data publisher of claim 1, wherein the memory area is registered to be accessible through RDMA read operations by a RDMA-capable hardware component of one or more of the subscriber devices.

9. A method of distributing messages from a data publisher to subscriber devices via a network fabric, the method comprising:
   allocating a memory area of a local memory unit of the data publisher to be accessible for Remote Direct Memory Access (RDMA) read operations by one or more of the subscriber devices; creating a message log in said memory area;
   sending messages to subscriber devices using a multicast transport protocol;
   storing in said memory area copies of said messages;
   wherein, prior to sending each message, the method comprises inserting, into a header each message that is sent to subscriber devices using the multicast transport protocol, information that allows a subscriber device to (A) autonomously calculate a virtual memory address in the message log of the publisher device, at which a copy of a missing message is stored, the missing message comprising a multicast message that was sent by the publisher device using the multicast transport protocol after a first message received by the subscriber device and before a second message received by the subscriber device; (B) autonomously perform one or more RDMA read operations to autonomously retrieve said missing message from said message log of the publisher device, without utilizing control messages and without obtaining a specific approval of the publisher device for performing the one or more RDMA read operations; (C) retrieve the missing message via RDMA in parallel to reception of further one or more multicast messages from the publisher device.

10. The method of claim 9, wherein one or more of the subscriber devices are authorized by the data publisher to read one or more messages stored in said memory area using one or more RDMA read operations independently of access to said memory area by other subscriber devices.

11. The method of claim 9, wherein allocating the memory area comprises:
   creating a cyclic buffer able to store copies of messages sent using the multicast transport protocol by the publisher application to the subscriber devices.

12. The method of claim 9, wherein the header comprises:
   a value indicating a sequence number of said message;
   a value indicating a size of said message; and
   a value indicating a virtual memory address of a memory location of said memory area in which the copy of said message is stored.

13. The method of claim 9, wherein the header comprises:
   a value indicating a sequence number of said message; and
   a value indicating a virtual memory address of said memory area in which a copy of a message consecutive to said message is stored.

14. The method of claim 9, comprising:
   sending said message using the multicast transport protocol through InfiniBand hardware.

15. The method of claim 9, comprising:
   sending said message by one or more operations that bypass an Operating System (OS) of the data publisher.

16. The method of claim 9, wherein the memory area is registered to be accessible through RDMA read operations by a RDMA-capable hardware component of one or more of the subscriber devices.

* * * * *